(12) United States Patent
Lehman et al.

(10) Patent No.: US 10,999,128 B2
(45) Date of Patent: *May 4, 2021

(54) SYSTEM AND METHOD FOR AUTOMATICALLY REPAIRING A FAULTILY CONNECTED NETWORK ELEMENT

(71) Applicant: Level 3 Communications, LLC, Broomfield, CO (US)

(72) Inventors: Bernie C. Lehman, Aurora, CO (US); James M. Adkins, III, Elizabeth, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/445,201

(22) Filed: Jun. 18, 2019

(65) Prior Publication Data

US 2019/0306012 A1 Oct. 3, 2019

Related U.S. Application Data

(63) Continuation of application No. 15/349,645, filed on Nov. 11, 2016, now Pat. No. 10,355,918.

(Continued)

(51) Int. Cl.
*H04L 1/00* (2006.01)
*H04L 12/24* (2006.01)

(Continued)

(52) U.S. Cl.
CPC .......... *H04L 41/0672* (2013.01); *H04L 41/06* (2013.01); *H04L 41/0686* (2013.01); *H04L 41/08* (2013.01); *H04L 41/0869* (2013.01); *H04L 41/0886* (2013.01); *H04L 43/0811* (2013.01); *H04L 47/746* (2013.01); *H04L 49/101* (2013.01); *H04L 49/557* (2013.01)

(58) Field of Classification Search
CPC ......... H04L 41/06; H04L 12/24; H04L 12/28; H04L 12/26; H04L 41/08
See application file for complete search history.

(56) References Cited

U.S. PATENT DOCUMENTS

2004/0008988 A1* 1/2004 Gerstal ................ H04B 10/032
398/45
2007/0260911 A1* 11/2007 Marilly ............... H04L 41/0663
714/4.1

(Continued)

*Primary Examiner* — Abdelnabi O Musa (57) ABSTRACT

Systems, methods, and non-computer-readable storage media for repairing a Network Element (NE) to transport data within a network. When a NE on the network encounters an error, such as a port not receiving data, that NE will issue an alarm. Unlike previous mechanisms for resolving the alarm, systems configured according to this disclosure provide for an automatic mechanism to repair the alarm. In some instances, this can mean automatically deploying resources to re-connect the NE according to a network plan. In other instances this can mean verifying the status of the NE matches a planned status (i.e., that the loss of signal, and the subsequent alarm, were planned for). If neither of these actions resolves the problems of the NE, the system can issue a notification for a network engineer to perform maintenance on the NE.

20 Claims, 7 Drawing Sheets

Related U.S. Application Data

(60) Provisional application No. 62/280,945, filed on Jan. 20, 2016.

(51) Int. Cl.
*H04L 12/911* (2013.01)
*H04L 12/26* (2006.01)
*H04L 12/939* (2013.01)
*H04L 12/933* (2013.01)

(56) References Cited

U.S. PATENT DOCUMENTS

| | | | |
|---|---|---|---|
| 2008/0049622 A1 | 2/2008 | Previdi | |
| 2010/0177644 A1* | 7/2010 | Kucharczyk | H04L 41/0681 370/250 |
| 2011/0075662 A1* | 3/2011 | Rathunde | H04L 41/0654 370/389 |
| 2012/0155323 A1 | 6/2012 | Ramachandran | |
| 2013/0124908 A1* | 5/2013 | Gowin | H04L 43/0817 714/2 |
| 2013/0326029 A1* | 12/2013 | Flynn | G06F 11/0793 709/220 |
| 2016/0021173 A1 | 1/2016 | Tapia | |
| 2016/0170848 A1 | 6/2016 | Yang | |
| 2017/0207951 A1 | 7/2017 | Lehman et al. | |

* cited by examiner

SYSTEM AND METHOD FOR AUTOMATICALLY REPAIRING A FAULTILY CONNECTED NETWORK ELEMENT

CROSS-REFERENCE TO RELATED APPLICATION

This application is a continuation of U.S. patent application Ser. No. 15/349,645, filed Nov. 11, 2016, which claims the benefit of priority of U.S. Provisional Patent Application Ser. No. 62/280,945, filed Jan. 20, 2016, the entire contents of each of which are incorporated herein by reference.

BACKGROUND

1. Technical Field

The present disclosure relates to automatically repairing a network element within a network.

2. Introduction

Computer networks are formed by linking together computers, servers, other computing equipment using networking elements to transport the data on the network. While some networking elements (such as routers and switches) have many ports through which they can transport data, other networking elements may only have a single input port and a single output port. However, regardless of the size and complexity of the network elements being used to transport data in the network, repairing and otherwise ensuring the network elements operate as planned can be a difficult process. For example, when a break in the network occurs, it can be difficult to isolate which network element, or which port on a network element, is causing the error. This troubleshooting process is time consuming, but can also result in further errors.

Similarly, sometimes the overall plan and configuration of the network changes, which in turn forces updates and changes to the NEs. When these network updates occur, individual network elements may cease to receive and/or transmit data, resulting in loss of signal alarms. Receiving such alarms, and determining if the alarms have merit, is further time consuming.

While the amount of human time spent repairing or verifying NE configurations to transport data on the network can be substantial, it does not necessarily lead to higher quality or fewer configuration errors. Instead, errors are often introduced into the overall system by requiring so much human interaction. The present disclosure addresses these and other deficiencies in the current repair process.

SUMMARY

Disclosed are systems, methods, and non-computer-readable storage media for repairing a Network Element (NE) to transport data within a network. When a NE on the network encounters an error, such as a port not receiving data, that NE will issue an alarm. Unlike previous mechanisms for resolving the alarm, systems configured according to this disclosure provide for an automatic mechanism to repair the alarm. In some instances, this can mean automatically deploying resources to re-connect the NE according to a network plan. In other instances this can mean verifying the status of the NE matches a planned status (i.e., that the loss of signal, and the subsequent alarm, were planned for). If neither of these actions resolves the problems of the NE, the system can issue a notification for a network engineer to perform maintenance on the NE.

As an example, a system configured according to this disclosure can be a server on a network configured to operate as an Automated Repair Tool (ART) for NEs on the network. The ART can receive a notification from a NE on the network indicating the NE is suffering a loss of signal (LOS). The ART retrieves a network plan of the network, and determines that the LOS on the NE does not match a planned status of the NE on the network plan. The ART then allocates resources to correct the LOS status on the NE, such that the corrected status of the NE matches the planned status.

DETAILED DESCRIPTION

Disclosed are systems, methods, and non-computer-readable storage media for repairing a Network Element (NE) to transport data within a network. When a NE on the network encounters an error, such as a port not receiving data, the NE will issue an alarm. Unlike previous mechanisms for resolving the alarm, systems configured according to this disclosure provide for an automatic mechanism to repair the alarm. In some instances, this can mean verifying the status of the NE matches a planned status. In other instances, this can mean automatically deploying resources to re-connect the NE according to the network plan. If neither of these actions resolves the problems of the NE, the system can issue a notification for a network engineer to perform maintenance on the NE.

As an example, a system configured according to this disclosure can be a server on a network configured to operate as an Automated Repair Tool (ART) for NEs on the network. The ART can receive a notification from a NE on the network indicating the NE is suffering a loss of signal (LOS). The ART retrieves a network plan of the network, and determines that the LOS on the NE does not match a planned status of the NE on the network plan. The ART then allocates resources to correct the LOS status on the NE, such that the corrected status of the NE matches the planned status.

Consider yet another example. Within a network, a switch connects two ports such that data is being transmitted and/or received. However, one of the ports carrying data on the switch breaks, and the data ceases to be communicated over the switch. This triggers an alarm, which is first communicated to a Network Element Management System (NEMS). The NEMS communicates with many NEs and, upon receiving an alarm from one of the NEs, communicates a notification of the alarm to an Automatic Repair Tool (ART).

The ART can be a server or other computing device configured to allocate resources for repairing NEs. The ART looks up the planned status of the NE based on a network plan, which can be stored within the ART or in a separate database. If the alarm was intentionally caused (according to the network plan), the ART can ignore the alarm (or make a note that alarms from that particular NE can be ignored). If the alarm was not intentional, the ART can perform a debugging process which can include reading data as it is received/transmitted by ports on the NE and/or creating a loopback on the NE ports. The debugging process can reveal if the NE is at fault and, if so, what ports or cross-connections within the NE are causing the error. The ART can then make a determination if a fix is available and deploy resources to automatically repair the fault, or if a ticket needs to be issued to a network engineer. Alternatively, if the fault lies with another NE on the network, the ART can continue the debugging process with respect to that other NE.

Figure 2A:
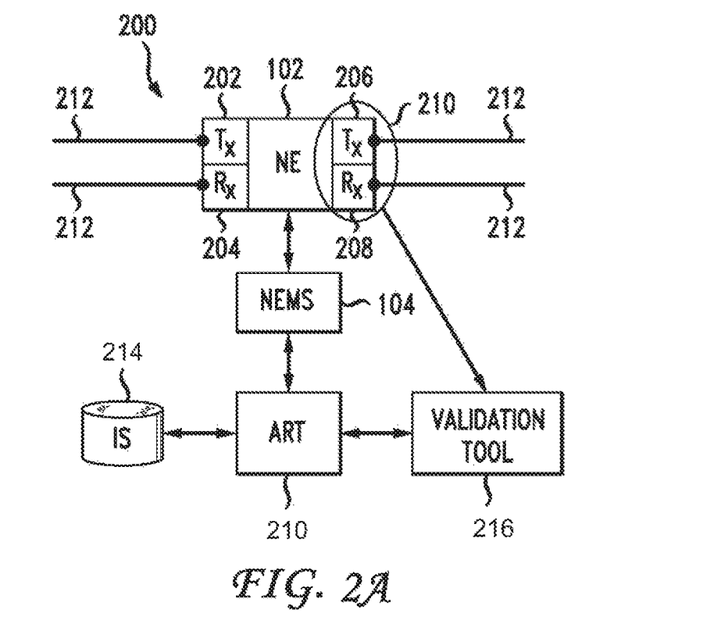
FIG. 2A illustrates a first example system architecture.
Figure 2B:
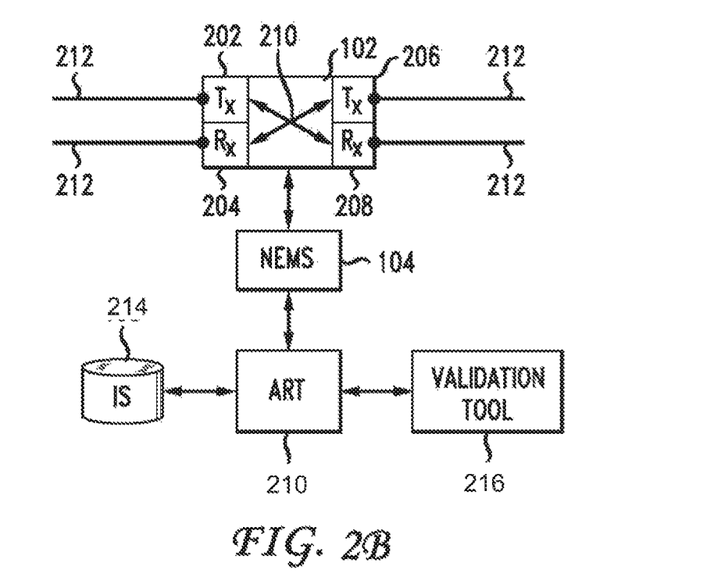
FIG. 2B illustrates an example of debugging in the first example system architecture.
Figure 3:
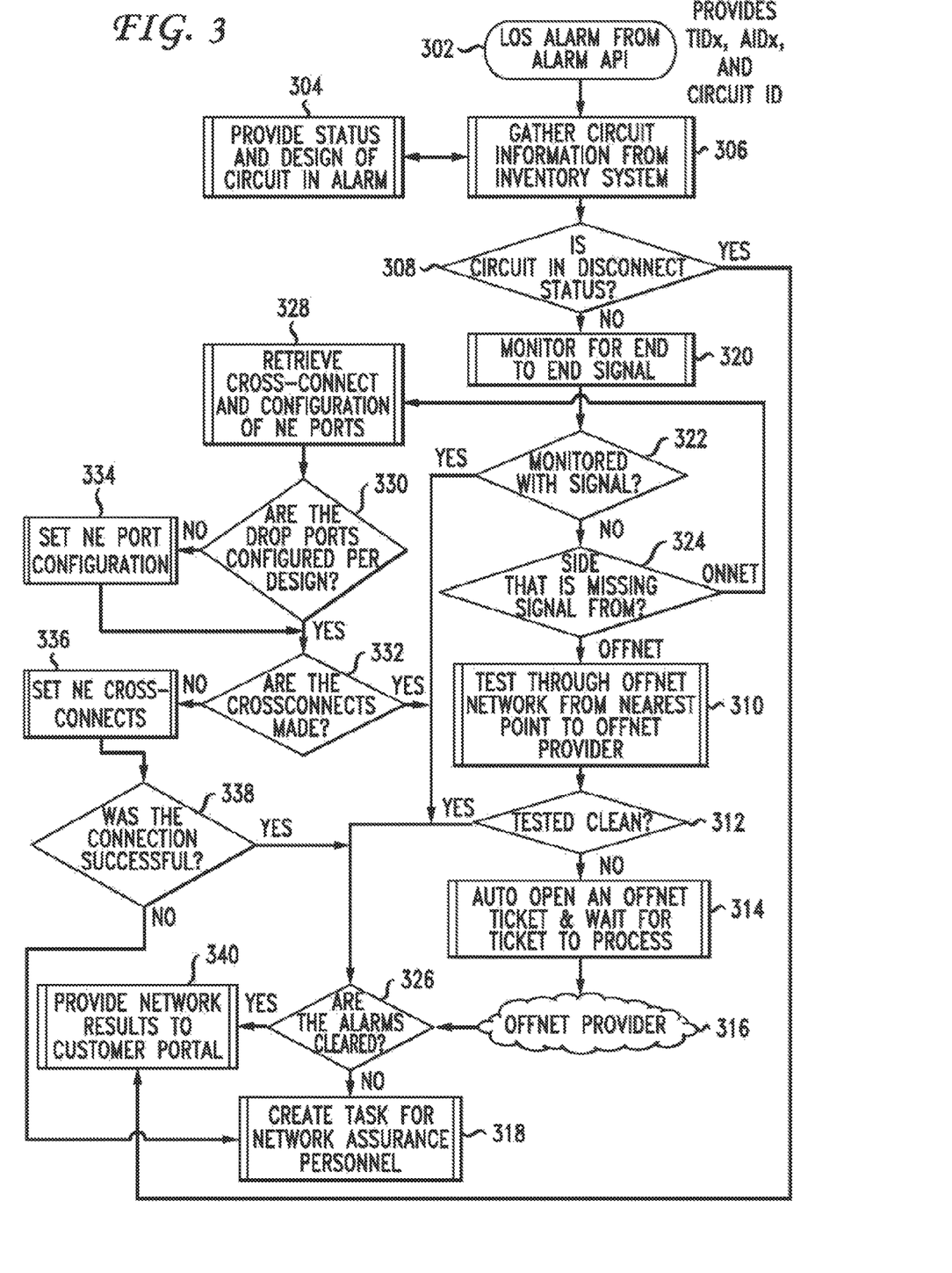
FIG. 3 illustrates an example flowchart for a system utilizing the first example system architecture.
Figure 4A:
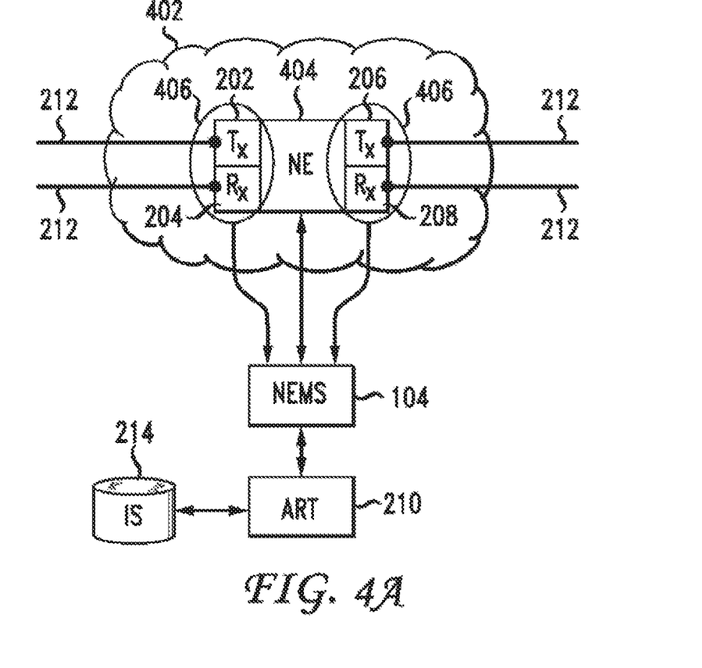
FIG. 4A illustrates a second example system architecture.
Figure 4B:
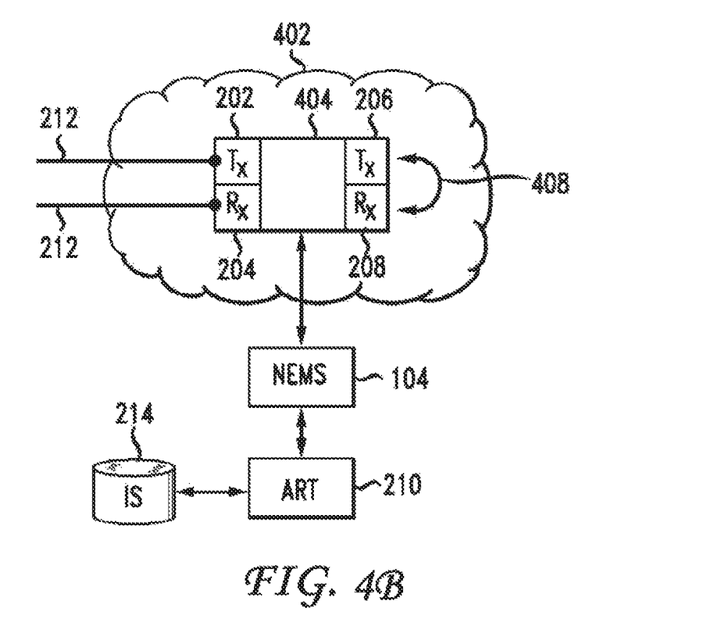
FIG. 4B illustrates an example of debugging in the second example system architecture.
Figure 5:
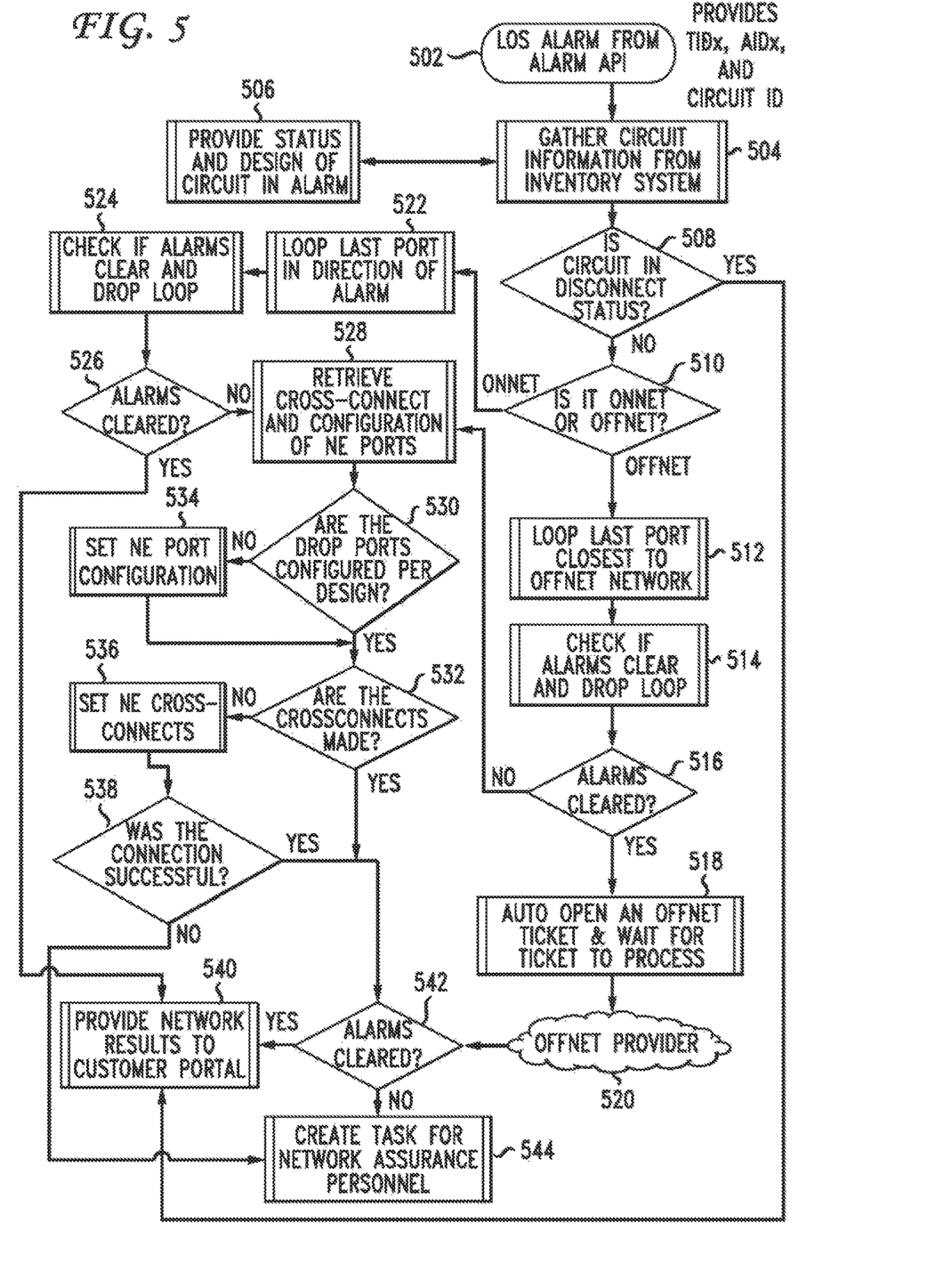
FIG. 5 illustrates an example flowchart for a system utilizing the second example system architecture.
Figure 6:
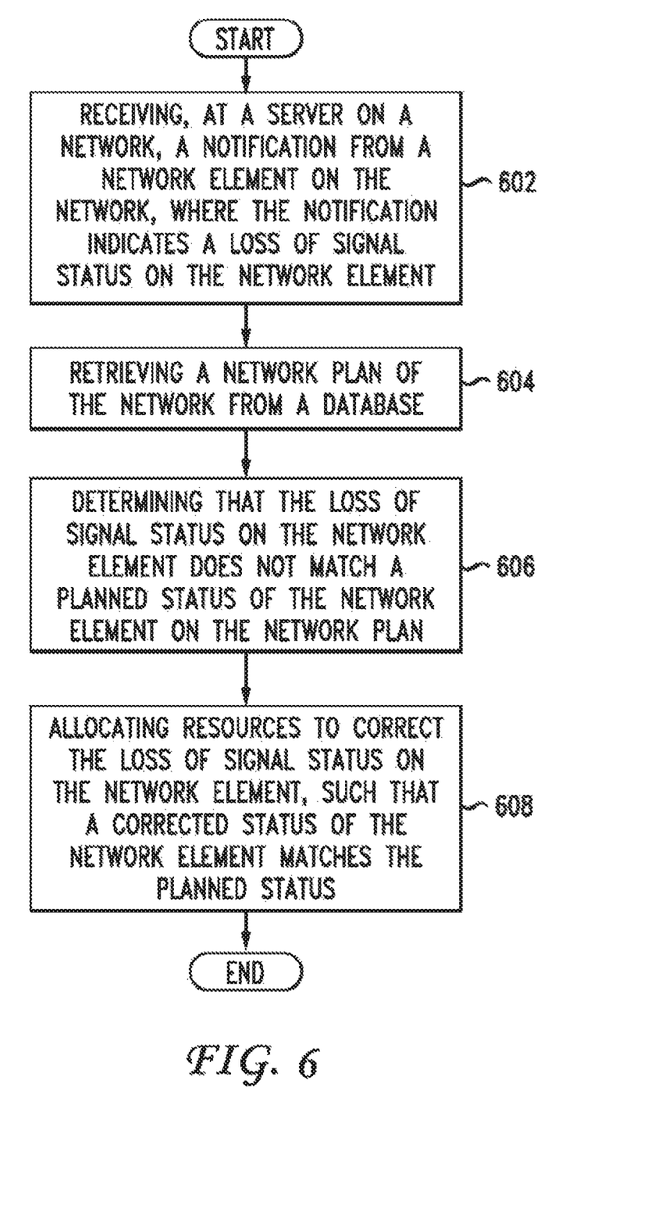
FIG. 6 illustrates an example method embodiment for a system configured to practice the concepts disclosed herein.

This disclosure describes how the ART receives communications from NEs, identifies needed repairs, and ultimately commissions the repairs to a NE so the NE can carry traffic in a network. First, an overview of a network element, and how a cross-connect operates, is provided in FIGS. 1A-1B. Next, an overview of the Automatic Repair Tool (ART) and a first exemplary architecture is shown in FIGS. 2A-2B, with FIG. 3 illustrating a flowchart for utilizing the architecture of FIGS. 2A-2B. FIGS. 4A-4B illustrate a second exemplary architecture, with FIG. 5 illustrating a flowchart for the architecture of FIGS. 4A-4B. FIG. 6 provides an exemplary method embodiment, while FIG. 7 describes an exemplary computer system/architecture which can be used to perform the method embodiment and can also be used to enable systems configured according to the concepts disclosed herein. The disclosure now turns to FIG. 1A.

Figure 1A:
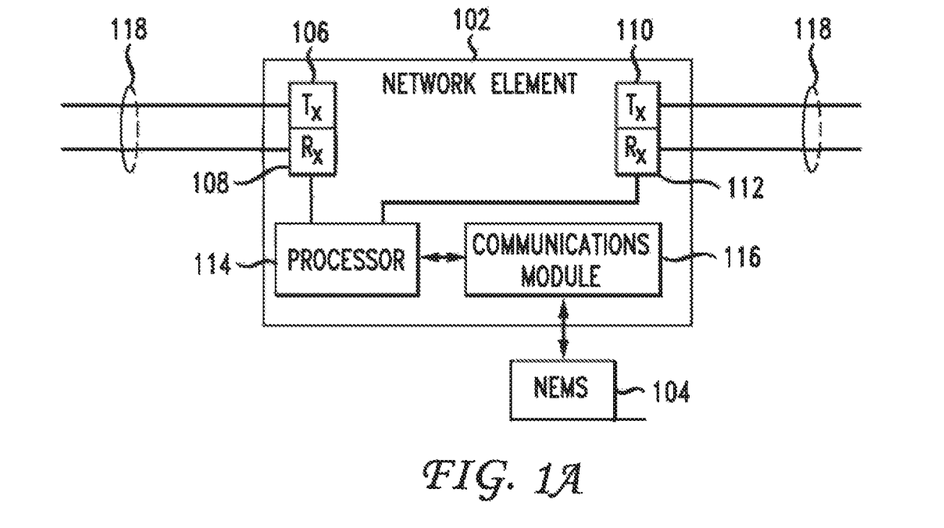
FIG. 1A illustrates an example network element which has not yet been configured to carry traffic on a network.

FIG. 1A illustrates an example NE 102 which has not yet been configured to carry traffic on a network. The NE 102 is physically connected to a network with wires (or cables) 118, which connect to specific ports on the NE 102. In this example, two ports are illustrated—one on the left, having Tx 106 and Rx 108 components, and one on the right having similar Tx 110 and Rx 112 components. In this illustration, each respective pair of Tx/Rx components form a single port, with the Tx components 106, 110 transmitting data away from the NE 102 and the Rx components 108, 112 receiving data at the NE 102. This is exemplary only. In reality ports can contain multiple pins and connections used for transmitting and/or receiving data.

Each port in the NE 102 is connected to a processor 114 (or other integrated circuit), which in turn is connected to a communications module 116. As data is received or transmitted on the ports, the processor 114 can report the traffic to the communications module 116, which in turn can forward the data to a NEMS (Network Element Management System) 104. The NEMS 104 is a networking tool which allows for monitoring of NEs in a network by collecting data from the NEs, aggregating the data, and presenting the compiled data in an understandable manner. While each NEMS can vary, communication with thousands of NEs in the network would not be unusual. Thus, the NEMS 104 can monitor the flow of traffic across NEs and identify faults and failures in transporting data across the network.

However, in FIG. 1A, the NE 102 is not configured to transport data on the network. For example, no connection is present from the left Rx component 108 to any other communication component in the NE 102, and likewise the right Rx component 112 has no connection. Therefore, any data received by the NE 102 at either Rx component 108, 112 will not be passed on to a further destination. In addition, the Tx components 106, 110 are not connected to a data source, resulting in the NE 102 of FIG. 1A not being capable of transmitting data.

Figure 1B:
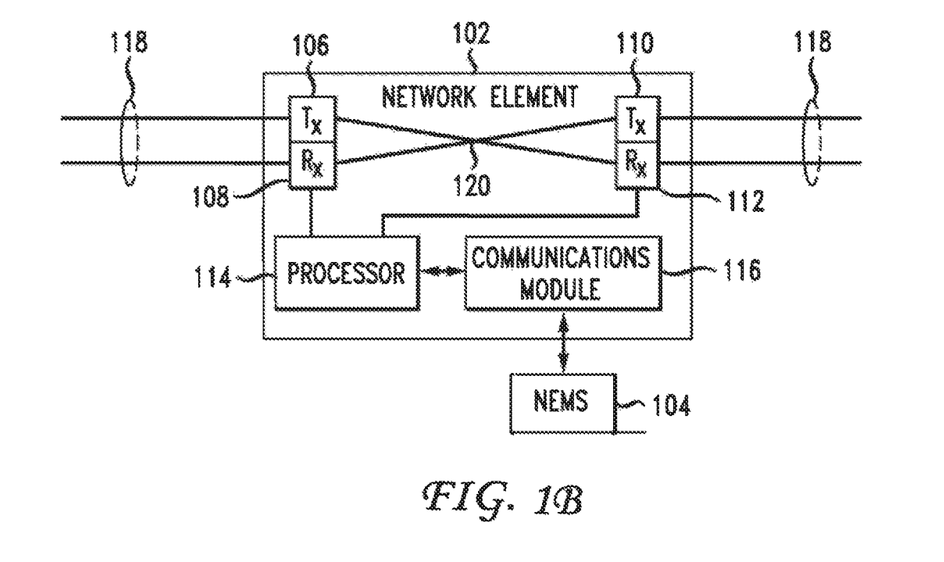
FIG. 1B illustrates the network element of FIG. 1A with a cross-connect allowing network traffic to flow between ports.

FIG. 1B illustrates the network element 102 of FIG. 1A with the addition a cross-connect 120. The cross-connect allows network traffic to flow between ports by passing data received on the left port at Rx component 108 to the right port at Tx component 110. Similarly, data received on the right port at Rx component 112 is passed to the left port Tx component 106. This allows data received by the network element 102 to be forwarded to designated destinations, with the NE 102 of FIG. 1B being described as a "commissioned" transport network element. However, when errors occur even a commissioned transport NE can cease functioning and require repair. FIGS. 2A and 2B next describe how repairs can be allocated using an Automatic Repair Tool.

FIG. 2A illustrates a first example system architecture. Such an architecture can, for example, be used for a T1 network for restoral/repair of services. It is particularly useful for systems in which use of a validation tool 216 is possible. In this architecture, a NE 102 is in communication with the NEMS 104, which in turn is in communication with an Automatic Repair Tool (ART) 210. The NE 102 in this example has two ports, each made of respective transport and receive elements. As illustrated, the left port (Tx component 202 and Rx component 204) is connected to respective data lines 212 and the right port (Tx component 206 and Rx component 208) is similarly connected to respective data lines 212. The left port (202, 204) is electronically connected to the right port (206, 208) using a cross-connect 120, thereby allowing data to be transported from port to port.

When a port on the NE 102 generates an alarm, the NEMS 104 receives the alarm and forwards it to the ART 210. For example, if the NE 102 stops receiving data on a port, this can result in a Loss of Signal (LOS) alarm being generated by the port, which the NEMS 104 would forward to the ART 210. The ART 210 is tasked with determining if the alarm was generated intentionally (in this example, if the LOS was created on purpose), or if the alarm was caused by a failed component. To make this determination, the ART is in communication with (or contains) a database/Information System (IS) 214 containing a copy of the plan of the network. This network plan can identify which NEs on the network are connected to one another, which ports on the respective NEs are used for the communications, and where cross-connects 120 should exist on individual NEs to connect respective ports. The ART 210 also communicates with (or contains) a validation tool 216 which can be used to determine what data individual ports are transmitting/receiving.

FIG. 2B illustrates an example of debugging in the first example system architecture using such a validation tool 216. In this example, the right port (206, 208) of the NE 102 has issued an alarm and the validation tool 216 has been configured to receive data from the right port transport/receive elements 206, 208. The validation tool 216 can receive information about what each respective element 206, 208 is transmitting/receiving, then forward that information to the ART 210. The ART 210 in turn can compare that data to the network plan received from the IS 214 and determine if the port is operating per the network plan. For example, a LOS alarm might be generated due to no data being communicated on a port, but if this is according to the network plan, no changes occur.

If the alarm indicates the alarm is not according to the network plan, the ART 210 can use the transmit/receive data identified by the validation tool 216 to determine where the error is being generated. If, for example, the port is receiving data on the receive element 208 from an outside line 212, but is unable to transmit data onto an outside line 212 via the transmit element 206, the ART 210 can identify the entire port as faulty. Likewise, an ability to transmit via the transmit element 206 but not receive data via the receive element 208 could render the entire port 206, 208 faulty. Alternatively, if the ART 210 identifies both elements 206, 208 as able to communicate with outside lines 212, the ART 210 may identify the port's ability to communicate with other ports in the NE 102 as compromised, and again identify the entire port or a portion of the port faulty.

In yet another instance, the ART 210 may identify that a cross-connect 120 is planned for in the network plan obtained from the IS 214, but is not actually implemented, or that a cross-connect 120 is in place when it should not be. In these instances, the ART 210 can allocate resources to correct the cross-connect issue, either by implementing the cross-connect or by removing the cross-connect. Once resources have been allocated, the ART 210 can confirm if the alarms have been eliminated and that the NE 102 is transporting data per the network plan. If so, the ART 210 can move onto the next alarm. If the NE 102 is not operating according to the network plan, the ART 210 can issue a ticket or other notification to a network engineer informing the engineer of the problem.

FIG. 3 illustrates an example flowchart for a system utilizing the first example system architecture. In this example, the ART 210 receives a LOS alarm from an alarm API (Application Program Interface) (302) on an NE 102. The LOS alarm can provide a Target Identification (TID$_x$), an Access Identifier (AIDA and a circuit identification (Circuit ID), which identify where the NE 102 operates within the network and the ports which the NE communicates. The ART 210 gathers circuit information from the Inventory System 214 (306), and provides the status and design of the circuit in alarm (304). The ART 210 performs a test to determine if the circuit is in a disconnect status (308). If the circuit is disconnected, the ART 210 concludes its debugging process by providing network results to a customer portal (340).

However, if the circuit is not disconnected, the ART 210 continues with the debugging process by monitoring for an end-to-end signal (320) at the specific port from which the alarm has been received. In other words, the ART 210 seeks to determine if signals are being transmitted/received from both sides of the port: the outside connection elements 212 as well as the interior connection elements corresponding to the cross-connect 120. If both are detected, the ART 210 determines if the alarms are cleared 326, creating a task for network assurance personnel (318) if the alarms are not cleared, while providing network results to a customer portal (340) if the alarms are cleared.

If the ART 210 identifies that data is not being transmitted and/or received from another NE, the ART 210 must determine if the other NE is under the jurisdiction of the ART 210. If so, the ART 210 can continue the debugging process on that NE. If the other NE is not under the jurisdiction of the ART 210, the NE is "Offnet" and proceeds through steps 310, 312, 314, and 316. First, the ART 210 tests through the Offnet network from the nearest point to the Offnet provider (310). If this tests clean (312), the ART 210 again checks to see if the alarms are cleared. If not, the ART 210 automatically opens an Offnet ticket and waits for the ticket to be processed (314) by the Offnet provider (316).

If the ART 210 identifies that data is not being transmitted and/or received in an "On net" circumstance, such as where the cross-connect 120 may be missing, the ART retrieves the cross-connect and configuration of NE ports 328 (the "network plan") from the Information System 214. Based on the network plan, the ART 210 determines if the drop ports are configured per design (330). If not, the ART 210 sets the NE 102 port configuration (334) according to the plan. The ART 210 then determines if the cross-connects are made (332), and if not, sets the NE cross-connects (336). If the connection is successful (338), the ART 210 verifies the alarms as cleared (326) and provides results to a customer portal (340), whereas if the connection is not successful a ticket for network personnel is generated (318).

FIG. 4A illustrates a second example system architecture. Such an architecture can, for example, be used for a T3 network for restoral of services. It is particularly useful for systems in which use of a validation tool 216 is not possible. In this example, the NE 404 is illustrated as being within a cloud 402, with individual ports 406 encompassing the respective left 202, 204 and right 206, 208 ports. The cloud 402 indicates that the NEMS 104 is distinct from the individual NEs, a configuration which can equally apply to the architecture illustrated in FIGS. 2A-2B. However, unlike the first architecture discussed in FIGS. 2A-2B, this architecture lacks a validation tool 216.

FIG. 4B illustrates an example of debugging in the second example system architecture. Because of the lack of a validation tool 216, this architecture utilizes loopback 408 conditions to determine the cause of alarms received at the ART 210. The loopback 408 allows the ART 210 to move transmit data from the transport element 206 on a port and receive that same data back on the receive element 208. Between the use of loopbacks 408 and the ability to verify if a cross-connect is in place, this second architecture can iteratively test ports and individual port components to determine the location of a component/configuration failure. As with the first architecture discussed above, the ART 210 then uses the debug data (in this example, from the loopback 408) with the network plan acquired from the Information System (IS) 214, and can allocate resources accordingly. Allocating of resources can include, for example, initiating/removing a cross-connect, changing ports, and/or generating a ticket for network supervising personnel to investigate an alarm.

FIG. 5 illustrates an example flowchart for a system utilizing the second example system architecture. This flowchart is similar to the flowchart of FIG. 3, but utilizes loops on ports during the debugging process. In this process, the ART 210 receives a Loss of Signal (LOS) alarm from an alarm API on the NE 404 (502). The LOS alarm can provide a Target Identification (TID$_x$), an Access Identifier (AIDA and a circuit identification (Circuit ID), which identify where the NE 404 operates within the network and the ports which the NE communicates. The Inventory System (IS) 214 provides status and design information of the circuit in alarm (506) and the ART 210 gathers such status and design information from the IS (504). The ART 210 then makes a determination if the NE 404 is disconnected (508). If the NE 404 is disconnected, that result is provided to a user via a customer portal (540).

If the NE 404 is still connected (that is, there is no disconnect status), the ART 210 continues with the debugging/repair process. First, the ART 210 makes a determination if the NE 404 is onnet or offnet (510). Without explicitly defining offnet versus onnet, offnet NEs are those which cannot be reconfigured or repaired by the ART 210, whereas onnet NEs are those which can be reconfigured or repaired by the ART 210.

When the NE 404 is offnet, the ART 210 creates a loop on the last port closest to the offnet network (512). The ART 210 checks to see if that loop clears the alarm (verifying the ability of the port to transmit/receive data) and drops the loop (514). If the alarms are cleared (518), this indicates that the error resides in the port and a ticket is automatically generated for network personnel of the offnet provider (518). The ticket is sent to the offnet provider (520) and the ART 210 waits until the alarms are cleared (542). When the alarms are cleared, results are provided to a customer portal (540). However, if the alarms are not cleared, a task is created for network assurance personnel (544).

When the NE 404 is onnet, the ART 210 loops the last port in the direction of the alarm (522). The ART 210 checks to see if the alarms clear and drops the alarm (524). If the alarms are cleared (526) the ART 210 provides network results to the customer portal, whereas if not, the ART performs a similar debugging procedure to that discussed above with respect to FIG. 3. Specifically, the ART 210 retrieves the network plan, and more specifically the cross-connect and configuration of NE ports (528) information from the IS 214. The ART 210 determines if the drop ports are configured according to the network design (530) and, if not, sets the NE port configurations (534). The ART 210 also determines if the cross-connects are made according to the network plan (532) and, if not, sets the NE cross-connects (536). At this point, if the connects are in place and successful (538), the ART 210 tests to see if the alarms are cleared (542) and either sends results to a customer portal (540) or creates a task for network personnel (544).

FIG. 6 illustrates an example method embodiment for a system configured to practice the concepts disclosed herein. For the sake of clarity, the method will be explained from the point of view of the ART 210 illustrated in FIGS. 2A, 2B, 4A, and 4B, which can be a server specifically formatted to operate in a non-generic fashion such that the server can allocate resources to repair and/or modify network elements connected to the server. In this exemplary method, the ART 210 receives a notification from a network element on the network, where the notification indicates a loss of signal status on the network element (602). The network can be, for example, a T1 or T3 network. The ART 210 retrieves a network plan from a database (604) and determines that the loss of signal status on the network element does not match a planned status of the network element to the network plan (606). The ART 210 then allocates resources to correct the loss of signal status on the network element, such that a corrected status of the network element matches the planned status (608). As an example, allocating resources can include initiating a cross-connect on the network element, removing a cross-connect and implementing a new cross-connect, modifying/repair a transport component of the port, modifying/repairing a receive component of the port, changing the port being used for the communications, and/or otherwise modifying the port so that the network element port configuration matches a network plan. After the allocating of the resources, the ART 210 can perform a verification that a status of the network element matches the planned status.

The exemplary method can further include use of a validation tool, such as initiating a validation tool to monitor the network element, where the validation tool monitors traffic on ports (made of at least one transmit component and one receive component) of the network element. This validation tool can then be used to help the ART 210 diagnose a cause for the loss of signal status based on the traffic.

The network element from which the notification is received can be located on or off network Conner or "offnet"). If the repair is beyond that of the ART 210, the allocation of resources can further include generating a ticket to a network engineer, such that a repair notification is provided to either the network administrator or an off-network administrator receive information regarding the network element.

Figure 7:
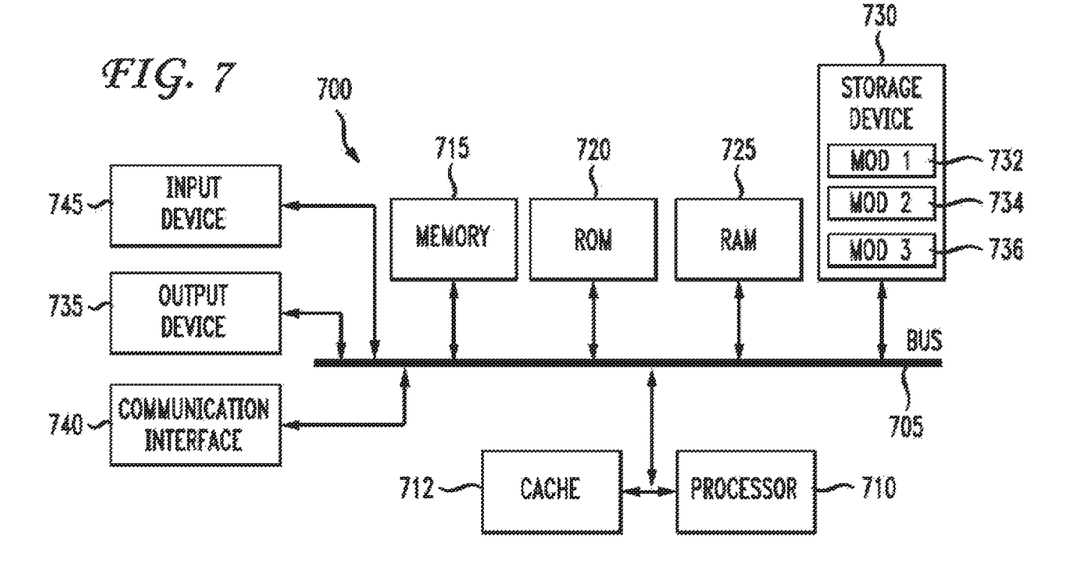
FIG. 7 illustrates an exemplary system embodiment.

Having discussed a system configured to perform the concepts and principles disclosed herein, the disclosure now turns a description of a computing system which can be employed by any of the devices referenced herein. With reference to FIG. 7, an exemplary system 700 includes a general-purpose computing device 700, including a processing unit (CPU or processor) 710 and a system bus 705 that couples various system components including the system memory 715 such as read only memory (ROM) 720 and random access memory (RAM) 725 to the processor 710. The system 700 can include a cache 712 of high speed memory connected directly with, in close proximity to, or integrated as part of the processor 710. The system 700 copies data from the memory 715 and/or the storage device 730 to the cache 712 for quick access by the processor 710. In this way, the cache 712 provides a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. It can be appreciated that the disclosure may operate on a computing device 700 with more than one processor 710 or on a group or cluster of computing devices networked together to provide greater processing capability. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

The system bus 705 may be any of several types of bus structures including a memory bus or memory controller, a peripheral bus, and a local bus using any of a variety of bus architectures. A basic input/output (BIOS) stored in ROM 720 or the like, may provide the basic routine that helps to transfer information between elements within the computing device 700, such as during start-up. The computing device 700 further includes storage devices 730 such as a hard disk drive, a magnetic disk drive, an optical disk drive, tape drive or the like. The storage device 730 can include software modules 732, 734, 736 for controlling the processor 710. Other hardware or software modules are contemplated. The storage device 730 is connected to the system bus 705 by a drive interface. The drives and the associated computer-readable storage media provide nonvolatile storage of computer-readable instructions, data structures, program modules and other data for the computing device 700. In one aspect, a hardware module that performs a particular function includes the software component stored in a tangible computer-readable storage medium in connection with the necessary hardware components, such as the processor 710, bus 705, display 735, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 700 is a small, handheld computing device, a desktop computer, or a computer server.

Although the exemplary embodiment described herein employs the hard disk 730, other types of computer-readable media which can store data that are accessible by a computer, such as magnetic cassettes, flash memory cards, digital versatile disks, cartridges, random access memories (RAMs) 725, and read only memory (ROM) 720, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 745 represents any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems enable a user to provide multiple types of input to communicate with the computing device 700. The communications interface 740 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 710. The functions these blocks represent may be provided through the use of either shared or dedicated hardware, including, but not limited to, hardware capable of executing software and hardware, such as a processor 710, that is purpose-built to operate as an equivalent to software executing on a general purpose processor. For example the functions of one or more processors presented in FIG. 7 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 720 for storing software performing the operations described below, and random access memory (RAM) 725 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 700 shown in FIG. 7 can practice all or part of the recited methods, can be a part of the recited systems, and/or can operate according to instructions in the recited tangible computer-readable storage media. Such logical operations can be implemented as modules configured to control the processor 710 to perform particular functions according to the programming of the module. For example, FIG. 7 illustrates three modules Mod1 732, Mod2 734 and Mod3 736 which are modules configured to control the processor 710. These modules may be stored on the storage device 730 and loaded into RAM 725 or memory 715 at runtime or may be stored in other computer-readable memory locations.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to all network types provided the network elements can communicate alarms to a server or other platform acting as an Auto Repair Tool. Various modifications and changes may be made to the principles described herein without following the example embodiments and applications illustrated and described herein, and without departing from the spirit and scope of the disclosure.

We claim:

1. A method comprising:
   receiving, at a server on a network, a notification from a network element on the network, wherein the notification indicates a status on the network element;
   retrieving a network plan of the network from a database;
   determining that the status on the network element does not match a planned status of the network element on the network plan;
   determining that the status on the network element is caused by a faulty cross-connect between two ports in the network element, wherein the faulty cross-connect is between a transmitter component of a first port and a receiver component of a second port; and
   allocating resources to correct the status on the network element, such that a corrected status of the network element matches the planned status.

2. The method of claim 1, wherein the allocating of resources comprises initiating a cross-connect on the network element to replace the faulty cross-connect.

3. The method of claim 1, further comprising initiating a validation tool to monitor the network element, wherein the validation tool monitors traffic on ports of the network element and diagnoses a cause for the status based on the traffic on the ports of the network element.

4. The method of claim 3, wherein the ports monitored by the validation tool comprise at least one transmit component and at least one receive component.

5. The method of claim 1, wherein the status on the network element is a loss of signal status on the network element.

6. The method of claim 1, further comprising creating a loopback on ports of the network element.

7. The method of claim 1, wherein the network element is located off-network.

8. The method of claim 1, wherein the allocating of the resources comprises generating a repair notification for an off-network administrator of the network element.

9. The method of claim 1, further comprising after the allocating of the resources, performing a verification that the corrected status of the network element matches the planned status.

10. The method of claim 1, wherein the network element is a T1-type network element.

11. A system comprising:
    a processor; and
    a computer-readable storage medium having instructions stored which, when executed by the processor, causes the processor to perform operations comprising:
      receive, at a server on a network, an alarm from a network element on the network;
      determine, in response to the alarm, that a status on the network element does not match a planned status of the network element on the network plan for the network;
      determine that the status on the network element is caused by a faulty cross-connect between two ports in the network element, wherein the faulty cross-connect is between a transmitter component of a first port and a receiver component of a second port; and
      allocate resources to correct the status on the network element, such that a corrected status of the network element matches the planned status.

12. The system of claim 11, wherein the allocating of resources comprises initiate a cross-connect on the network element to replace the faulty cross-connect.

13. The system of claim 11, the computer-readable storage medium having additional instructions stored which, when executed by the processor, cause the processor to perform operations comprising initiate a validation tool to monitor the network element, wherein the validation tool monitors traffic on ports of the network element and diagnoses a cause for the status based on the traffic on the ports of the network.

14. The system of claim 13, wherein the ports monitored by the validation tool comprise at least one transmit component and at least one receive component.

15. The system of claim 11, wherein the status on the network element is a loss of signal status on the network element.

16. The system of claim 11, the computer-readable storage medium having additional instructions stored which, when executed by the processor, cause the processor to perform operations comprising create a loopback on ports of the network element.

17. The system of claim 11, wherein the network element is located off-network.

18. The system of claim 17, wherein the allocating of the resources comprises generate a repair notification for an off-network administrator of the network element.

19. The system of claim 11, the computer-readable storage medium having additional instructions stored which, when executed by the processor, cause the processor to perform operations comprising after the allocating of the resources, perform a verification that the corrected status of the network element matches the planned status.

20. A non-transitory computer-readable storage device having instructions stored which, when executed by a processor, cause the processor to perform operations comprising:
    receive a notification from a network element on a network, wherein the notification indicates a status on the network element;
    retrieve a network plan of the network from a database;
    determine that the status on the network element does not match a planned status of the network element on the network plan;
    determine that the status on the network element is caused by a faulty cross-connect between two ports in the network element, wherein the faulty cross-connect is between a transmitter component of a first port and a receiver component of a second port; and
    allocate resources to correct the status on the network element, such that a corrected status of the network element matches the planned status.

* * * * *